United States Patent [19]

Metlitsky et al.

[11] Patent Number: 5,744,788

[45] Date of Patent: *Apr. 28, 1998

[54] VOICE-ACTIVATED OPTICAL SCANNING SYSTEM

[75] Inventors: Boris Metlitsky, Stony Brook; Mark Kricheyer, Hauppauge; Edward Barkan, Miller Place; Howard M. Shepard, River; Jerome Swartz, Old Field, all of N.Y.

[73] Assignee: Symbol Technologies, Inc., Holysville, N.Y.

[*] Notice: The term of this patent shall not extend beyond the expiration date of Pat. No. 5,250,790.

[21] Appl. No.: 807,286

[22] Filed: Feb. 27, 1997

Related U.S. Application Data

[60] Continuation of Ser. No. 460,729, Jun. 2, 1995, which is a division of Ser. No. 366,383, Dec. 29, 1994, Pat. No. 5,479,002, which is a continuation of Ser. No. 79,761, Jun. 21, 1993, abandoned, which is a continuation-in-part of Ser. No. 881,280, May 11, 1992, Pat. No. 5,306,900, which is a division of Ser. No. 699,417, May 13, 1991, Pat. No. 5,191,197, which is a continuation-in-part of Ser. No. 193,265, May 11, 1988, Pat. No. 5,144,120.

[51] Int. Cl.$^6$ .................................................. G06K 7/10
[52] U.S. Cl. ........................... 235/454; 235/462; 235/472
[58] Field of Search ............................. 235/454, 456, 235/462, 472

[56] References Cited

U.S. PATENT DOCUMENTS

| | | | |
|---|---|---|---|
| 1,015,715 | 1/1912 | Schindler | 200/DIG. 2 |
| 1,165,970 | 12/1915 | Harris | 200/DIG. 2 |
| 1,325,885 | 12/1919 | Weber | 200/DIG. 2 |
| 1,709,850 | 4/1929 | Hodecker | 200/DIG. 2 |
| 1,906,193 | 4/1933 | Vitale | 200/DIG. 2 |
| 3,700,836 | 10/1972 | Rackson | 200/DIG. 2 |
| 3,964,045 | 6/1976 | Conley | 340/575 |
| 3,978,318 | 8/1976 | Romeo et al. | 235/472 |
| 4,282,425 | 8/1981 | Chadima, Jr. et al. | 235/472 |
| 4,722,625 | 2/1988 | O'Brien | 401/6 |
| 4,766,299 | 8/1988 | Tierney et al. | 235/472 |
| 4,851,654 | 7/1989 | Nitta | 235/492 |
| 5,079,629 | 1/1992 | Oz | 350/100 |
| 5,191,197 | 3/1993 | Metlitsky et al. | 235/472 |
| 5,250,790 | 10/1993 | Metlitsky et al. | 235/462 |
| 5,272,324 | 12/1993 | Blevins | 235/462 |
| 5,340,972 | 8/1994 | Sandor | 235/472 |
| 5,514,861 | 5/1996 | Swartz et al. | 235/472 |
| 5,543,610 | 8/1996 | Band et al. | 235/462 |
| 5,614,706 | 3/1997 | Band et al. | 235/472 |

*Primary Examiner*—Donald T. Hajec
*Assistant Examiner*—Michael G. Lee
*Attorney, Agent, or Firm*—Kirschstein, et al.

[57] ABSTRACT

A hands-free scanning system for reading indicia having parts of different light reflectivity, including a housing having a window and an actuatable electro-optical scanner in the housing for projecting a light beam through the window to indicia to be read, for scanning the indicia. The system further detects light of variable intensity that is reflected off the indicia to generate an electrical signal representative of the indicia. The housing is mounted on an arm of an operator and the scanner initiates reading of the indicia upon an audio command (i.e., voice activation) from a user.

20 Claims, 4 Drawing Sheets

VOICE-ACTIVATED OPTICAL SCANNING SYSTEM

CROSS-REFERENCE TO RELATED APPLICATIONS

This application is a continuation of application Ser. No. 08/460,729 filed 02 Jun. 1995, now pending, which is a divisional of application Ser. No. 08/366,383 filed 29 Dec. 1994, which issued as U.S. Pat. No. 5,479,002, which is a file-wrapper continuation of application Ser. No. 08/079,761 filed 21 Jun. 1993, now abandoned, which is a continuation-in-part of application Ser. No. 07/881,280 filed 11 May 1992, which issued as U.S. Pat. No. 5,306,900, which is a divisional of application Ser. No. 07/699,417 filed 13 May 1991, which issued as U.S. Pat. No. 5,191,197, which is a continuation-in-part of application Ser. No. 07/193,265 filed 11 May 1988, which issued as U.S. Pat. No. 5,144,120.

BACKGROUND OF THE INVENTION

1. Field of the Invention

This invention generally relates to electro-optical systems for reading indicia of different light reflectivity such as bar code symbols and, more particularly, to mountable bar code readers.

2. Description of Related Art

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; 4,825,057; 4,835,374; and 4,845,350, as well as U.S. appln. Ser. No. 08/400,840 filed Mar. 8, 1995—all of said patents and patent applications being owned by the assignee of the instant invention—have generally been designed to read indicia having parts of different light reflectivity, e.g., bar code symbols, particularly of the Universal Product Code (UPC) type, at a certain working or reading distance from a hand-held or stationary scanner.

Typically, a light source such as a laser generates a light bean which is optically modified and focused to form a beam spot of a certain size at a working distance relative to a housing and is directed by optical components, including a reflecting mirror, along a light path through an exit port of the housing toward a bar code symbol located in the vicinity of the working distance for reflection from the symbol. A photodetector having a field of view extending across and slightly past the symbol detects light of variable intensity reflected off the symbol and generates electrical signals indicative of the detected light. These electrical signals are decoded into data descriptive of the symbol. A scanning component may be situated in the housing, and is operative to either sweep the beam spot in a scan pattern across the symbol, or to scan the field of view of the photodetector, or simultaneously do both.

The components for the light scanning system, including the light source, optics, photodetector, scanning component and an electrical conductor, are mounted together in a common assembly to constitute a compact, lightweight, scan module. The scan module is mounted in an interchangeable, modular manner in housings of different configurations.

For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766,299) or on one or more fingers of the operator's hand, typically with the aid of a strap, a clip, or a glove. The housing can be mounted on the operator's arm, typically adjacent or on the wrists The housing can be mounted in a countertop workstation. The housing can be mounted in a mobile cart, or shopping cart, or, in some cases, even in a stationary installation.

The compact, lightweight nature of the scan module enables myriad other housing configurations to be fashioned. Thus, the scan module can be mounted anywhere on an operator's person, e.g. in a helmet to be worn on the operator's head, in eyeglasses to be worn in front of the operator's eyes, in a shoulder or body harness, etc.

SUMMARY OF THE INVENTION

1. Objects of the Invention

It is a general object of this invention to advance the state of the art of electro-optical systems for reading indicia of different light reflectivity, particularly laser scanner systems for reading bar code symbols.

Another object of this invention is to simplify operation of bar code readers.

2. Features of the Invention

In keeping with these objects, and others which will become apparent hereinafter, one feature of this invention resides, briefly stated, in an electro-optical system for reading indicia having parts of different light reflectivity, e.g. bar code symbols having alternating bars and spaces.

In one preferred embodiment, the bar code reader of the invention comprises actuatable electro-optical scanning means for projecting a light beam onto a bar code symbol to be read, for scanning the bar code symbol, and for detecting light of variable intensity that is reflected off the bar code symbol to generate an electrical signal representative of the bar code symbol. Also, in the bar code reader, activation means activates the scanning means to initiate reading of the bar code symbol when an object bearing the bar code symbol is proximate to the scanning means. The reader also includes mounting means for mounting the scanning means and the activation means onto an operator to operate the bar code reader. The mounting means can comprise, for example, a glove, a helmet, eyeglasses, a strap, a clip, a shoulder harness, or a body harness.

In another embodiment, the system of the invention comprises a scanning system for reading indicia having parts of different light reflectivity, comprising a housing, a light beam generator and scanner provided in the housing for scanning a beam across the indicia, and a detector provided in the housing responsive to light reflected from the indicia for generating an electrical signal representative of the indicia. Activation means provided in the housing activates the light beam generator and scanner when an object bearing the indicia is proximate to the reader or voice activation (i.e., triggering when the user says "scan") may also be used. Also, mounting means mounts the housing onto an operator to operate the bar code reader.

In still another embodiment, a method of the invention comprises the steps of scanning a light beam across a bar code symbol using a bar code reader when an object bearing the bar code symbol is within a predetermined distance of the reader; detecting the light reflected from the bar code symbol; and generating electrical signals representative of the bar code symbol in accordance with the detected light.

The novel features which are considered as characteristic of the invention are set forth in particular in the appended claims. The invention itself, however, both as to its con-

DETAILED DESCRIPTION OF THE PREFERRED EMBODIMENTS

Figure 1A:
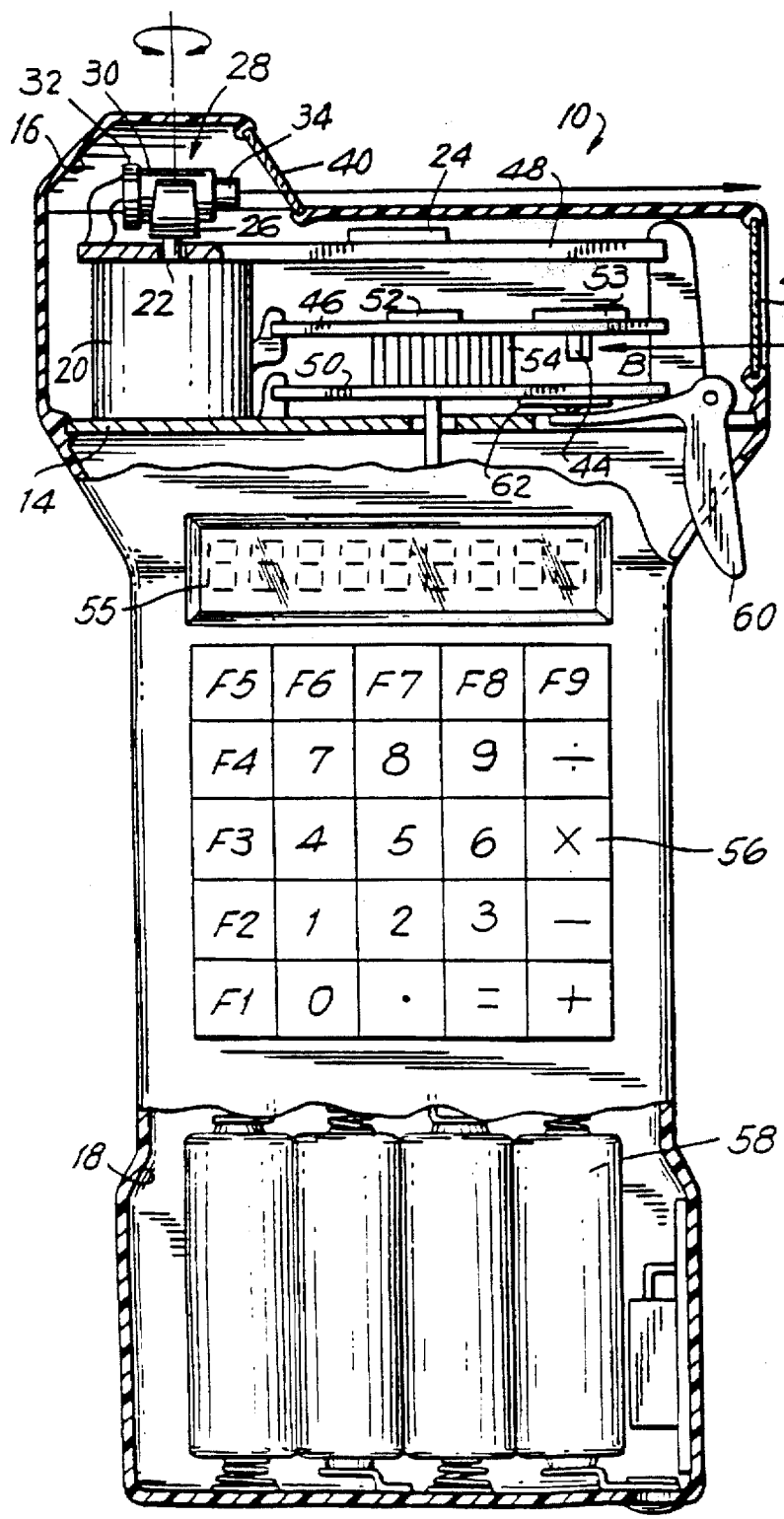
FIG. 1A is a partly broken-away, partly sectioned side view of a hand-held light scanning system.
Figure 1B:
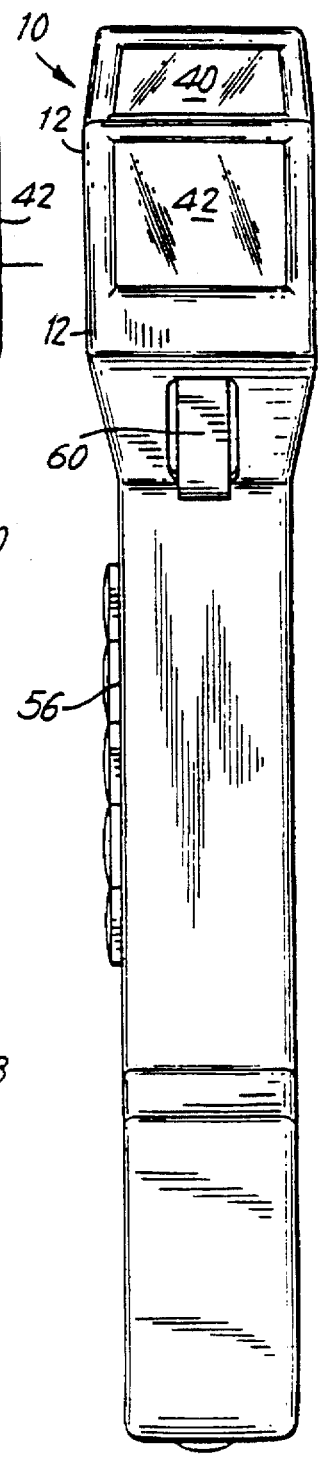
FIG. 1B is an end view of FIG. 1A.

Referring now to the drawings, reference numeral 10 in FIGS. 1A and 1B generally identifies an arrangement in a scanner system of the type generally described in the above-identified patents and patent applications, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters and, in short, any indicia having portions of different light reflectivity.

The arrangement 10 comprises a hand-held housing 12 having a base 14 which subdivides the interior of the housing into an upper half 16 and a lower half la. A lightweight, high-speed, miniature scanning motor 20, similar to that described in U.S. Pat. No. 4,496,831, is mounted on base 14. The motor 20 has an output shaft 22 which is repetitively driven in alternate circumferential directions about an axis along which the shaft extends over arc lengths less than 360° in each direction.

One difference between the motor 20 of this invention and the motor of U.S. Pat. No. 4,496,831 is the superstructure that is mounted on the output shaft 22. Instead of a planar mirror, as taught by said patent, the invention proposes, in FIG. 1A, mounting a generally U-shaped support 26 at the end of the shaft 22, and mounting a laser/optics subassembly 28 on the support 26. The subassembly 28 and the support 26 are jointly oscillated and turned with the shaft 22.

Figure 3:
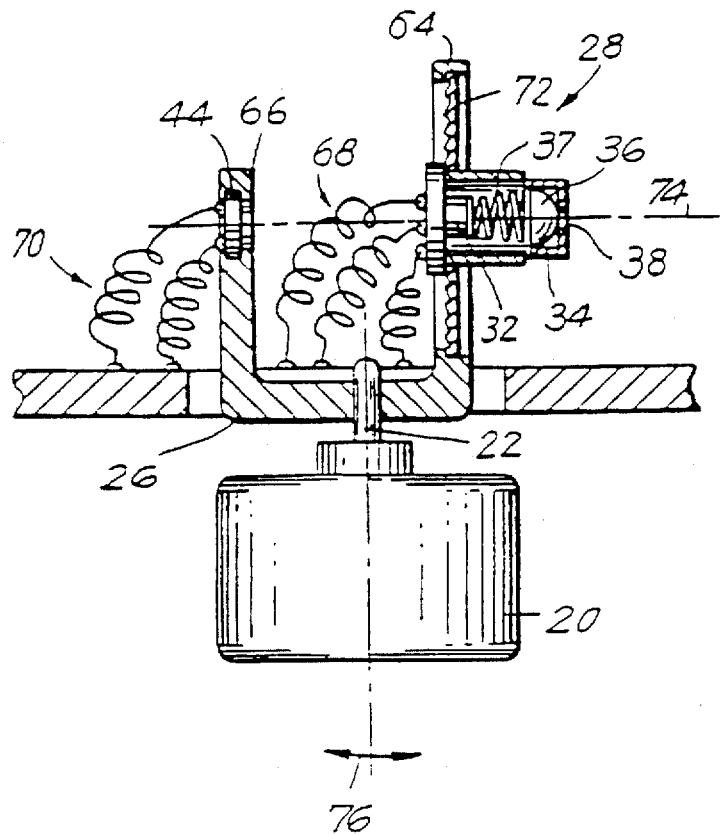
FIG. 3 is a partly sectioned side view of another scanner arrangement.

The subassembly 28 includes an elongated hollow tube 30, a laser diode 32 fixedly mounted at one axial end region of the tube 30, a lens barrel 34 mounted at the opposite axial end region of the tube 30, and a focusing 36 lens mounted within the barrel (see FIG. 3). The focusing lens 36 is preferably a plano-convex lens, but may be spherical, convex or cylindrical as well. The barrel 34 has an end wall formed with an aperture stop 38 which is an opening extending through the end wall. The barrel 34 is mounted for longitudinal telescoping movement within and along the tube 30. The lens 36 is situated adjacent the end wall of the barrel and is mounted for joint movement with the barrel. The position of the barrel and, in turn, of the lens relative to the diode, is fixed typically by gluing or clamping, at the assembly site so that a known distance between the lens and the aperture stop, on the one hand, and between the lens, the aperture stop and the diode, on the other hand, is obtained. A coil spring 37 (see FIG. 3) is located within, and extends along, the barrel and tube, and has one coil end bearing against the diode, and another coil end bearing against a planar side of the lens. The spring urges the lens against the end wall having the aperture stop, thereby fixedly locating the lens relative to the aperture stop.

It is sufficient for this invention to understand that the subassembly 28 includes a solid-state laser diode 32 operative for propagating and generating an incident laser bean, either in the invisible or visible light range, and the combination of a focusing lens and an aperture stop together operative for focusing the laser beam to have a beam cross-section or beam spot of a certain waist size within a range of working distances relative to the housing 12. The focused beam passes through the aperture stop 38 and through a scan window 40 on the housing in the vicinity of a reference plane located exteriorly of the housing within the range of working distances along an outgoing optical path.

During the alternate, repetitive oscillations of the shaft 22, the support 26 and the subassembly 28 likewise participate in this oscillatory movement, thereby causing the beam spot to be swept in an arc whose center of curvature is located at the diode across the symbol at the reference plane and to trace a curved scan line thereat. Hence, to effect sweeping of a beam spot across a symbol, the laser diode 32 and the optical components are jointly turned as a unitary structure about an axis parallel to the reference plane.

A portion of the light reflected off the symbol passes along a return path through a second window 42 on the housing in the direction of arrow B to a photodetector 44 for detecting the variable intensity of the returning portion of the reflected laser light over a field of view, and for generating an electrical analog signal indicative of the detected variable light intensity. In the FIG. 1A embodiment, the photodetector 44 is stationarily mounted on the printed circuit board 46. Printed circuit boards 48 and 50 at either side of board 46 contain signal processing circuitry 52 and microprocessor control circuitry 53 for converting the analog electrical signal to a digital signal, and for processing the digital signal to data descriptive of the symbol being read. Details of the signal processing and microprocessor control circuitry can be had by reference to the above-identified patents anid applications.

A two-part, multi-wire, plug-in cable-connector 54 has one part electrically connected to the signal processing and microprocessor control circuitry and another part electrically connected to a flexible, multi-wire cable 54' connected to a display 55 and a keyboard 56. A rechargeable battery pack 58 supplies power to the laser diode and the electrical circuitry in the housing. By moving only the laser diode and the optical components relative to the stationary photodetector, power from the battery pack is conserved.

Means for initiating reading may advantageously include a trigger 60 mounted on the housing 12. The trigger extends in part outwardly of the housing to be manually actuated by a user who is holding the housing 12 in his hand. The trigger is operatively connected through trigger switch 62 and actuates the laser diode 32, the motor 20, the photodetector 44, the signal processing circuitry 52 and the control circuitry 53 to initiate a reading of the symbol. The trigger is actuated once for each symbol to be read, each symbol in its respective turn. Once the control circuitry determines that the symbol has been successfully decoded, the control circuitry terminates the reading of the symbol and deactuates the previously actuated components in the housing and readies the system for the next symbol.

Figure 2:
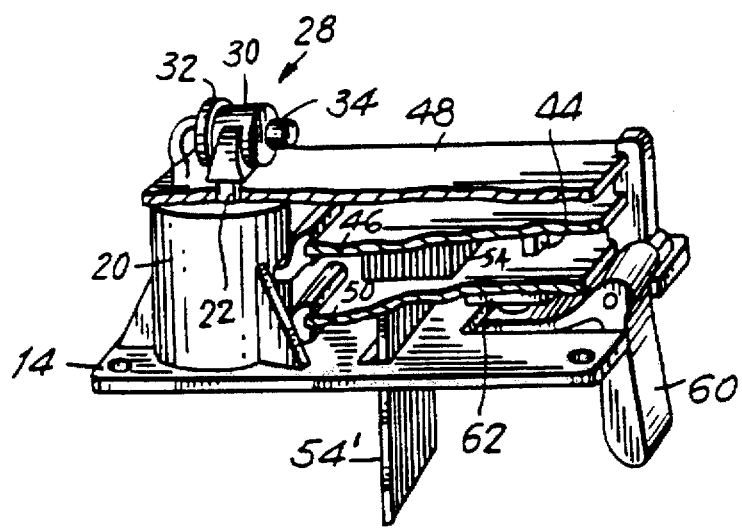
FIG. 2 is a front perspective view of a scanner arrangement of the system of FIG. 1A.

FIG. 2 illustrates the various electrical, mechanical and optical components assembled as a modular unit prior to mounting in the upper half 16 of the housing 12 of FIGS. 1A, 1B. The electrical circuitry on the printed circuit boards 46, 48, 50, as well as on base 14, has been omitted from FIG. 2 for the sake of clarity.

Turning now to FIG. 3, like parts with that of FIG. 1A have been identified with like reference numerals. The oscillating motor 20, once again, has an output shaft 22 on which a generally U-shaped support 26 is mounted. A laser/optics subassembly 28 is mounted on one leg 64 of the support. A photodetector 44 is mounted on another leg 66 of the support. Coiled tensile wire groups 68, 70 connect the diode 32 and the photodetector 44 to the non-illustrated electrical circuitry on printed circuit board 48. Although coiled wires have been illustrated, other types of electrical connectors, e.g., flat cable, could be employed. A collecting lens 72 is mounted on leg 64 and coaxially surrounds subassembly 28. The lens 72, the subassembly 28 and the photodetector 44 all have a common boresight or optical axis 74 along which the optical and return paths are co-linear, and are all oscillatable as a unit in alternate circumferential directions about the axis along which shaft 22 extends.

Figure 4:
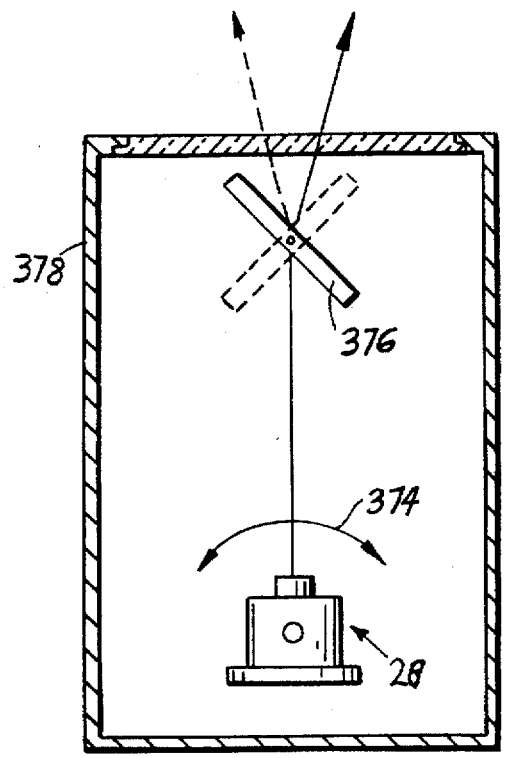
FIG. 4 is a partly broken-away, perspective view of a hand-held scanning system in accordance with one embodiment of this invention.

FIG. 4 shows the compact laser/optics subassembly 28 mounted on the reciprocating motor 20, as described above, installed in a hand-held housing 210 equipped with a display 212 and a keyboard 214. The housing 210 has a rectangular cross-section and, at its top, is provided with a movable superstructure that enables scanning to be performed to the right or, in another mode of operation, to the left of the housing.

The housing 210 has a top rectangular wall 216 fixedly mounted in place with the aid of four screws 218 at the corners of the top wall. A hood 220 is mounted at one end of the top wall. A stationary reflecting mirror 222 is located within the confines of the hood above the top wall 216. An exit port or scan window 224 closes the interior of the hood from the environment. The mirror 222 is positioned in the path of the emitted laser beam emanating from the laser/optics subassembly 28, and redirects the laser beam toward one side, e.g, toward the right side, of the housing. Returning light from the symbol being read passes through the same window 224 and is collected by photodetector 44.

By removing the four screws 218, turning the superstructure by 180°, replacing the screws 218, the scanning arrangement will work just as described above, except that this time, the mirror 222 will redirect the laser beam toward the other side, e.g., toward the left side, of the housing. In this way, right-and left-handed users can be accommodated.

Figure 5:
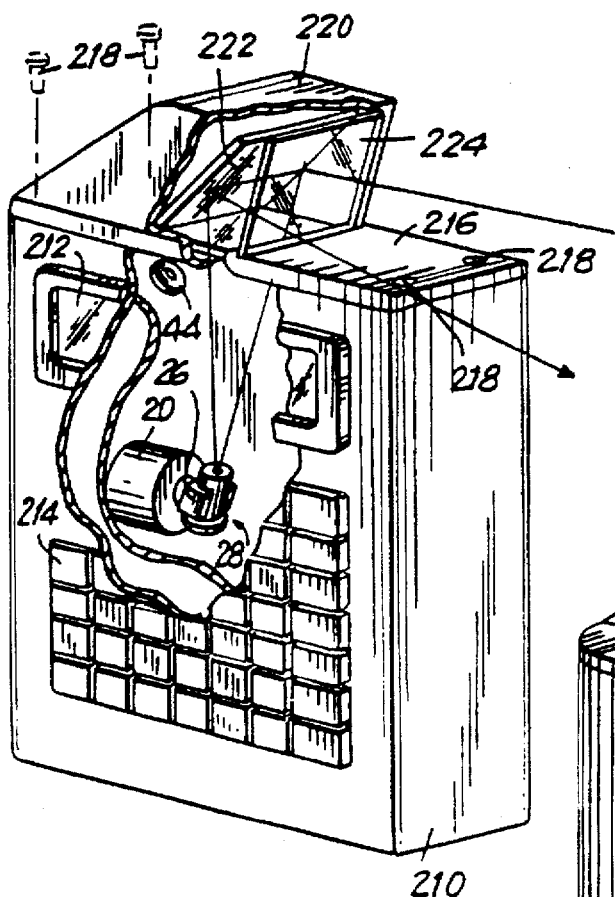
FIG. 5 is a perspective view of a hand-held, swivel-type scanning system in accordance with another embodiment of this invention.

To the same effect is the structure shown in FIG. 5 in which the emitted beam can also be directed toward the right or the left. A housing 226 of cylindrical cross-section has a circular top wall 228 on which a hood 230 is supported. A reflecting mirror identical to mirror 222 is mounted within hood 230. A scan window 232 closes the hood 230. An L-shaped locking lug 234 depends from the top wall 228 and, in the illustrated position, lockingly engages a hook 236 provided on the circular side wall of the housing 226. The same laser/optics subassembly shown in FIG. 4 is mounted within housing 226. The laser beam is propagated toward the right in FIG. 5.

To accommodate the user, the top wall 228 and hood 230 can be turned to the position shown in phantom lines until the lug 234 engages another non-illustrated hook spaced 180° away from hook 236. In this locked position, the laser beam is propagated toward the left in FIG. 5. The swiveling of a locking lug to engage one or the other of two hooks with a snap-type action is somewhat easier to perform than the removal and replacement of screws as described for FIG. 4.

Figure 6:
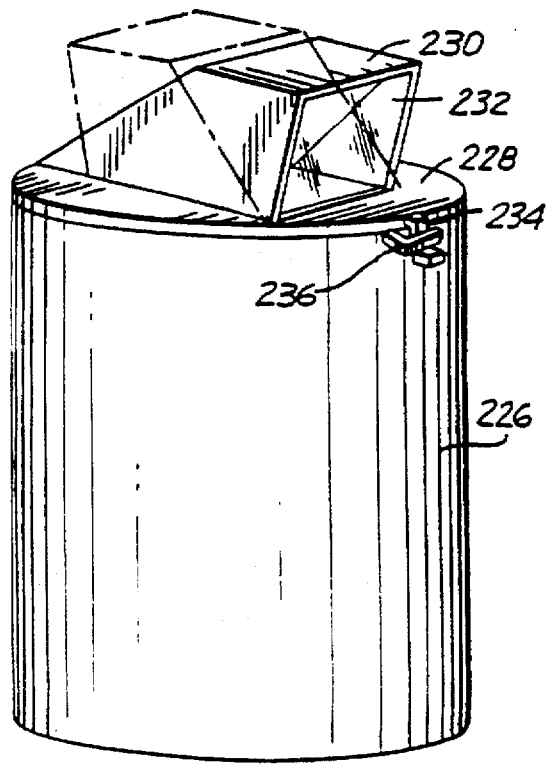
FIG. 6 is a top plan view of a scanning system adapted to accommodate right- and left-handed users in accordance with another embodiment of this invention.

FIG. 6 depicts another arrangement for accommodating right-handed and left-handed users, as previously discussed in connection with FIGS. 4 and 5. A laser/optics assembly 28, as previously described, is oscillated during scanning in the directions of the double-headed arrow 374. A light-directing element 376, preferably of light-transmissive material, is positioned in the light path of the light beam emanating from the assembly 28. The element 376 is positioned in either the solid-line or the dashed-line position, with the aid of a handle extending exteriorly of the housing 378. In the solid-line position, the element 376 steers the light beam about 10°–15° off to the right of its straight-line path to accommodate left-handed users. In the dashed-line position, the element 376 steers the light beam about 10°–15° off to the left of its straight-line path to accommodate right-handed users.

Figure 7:
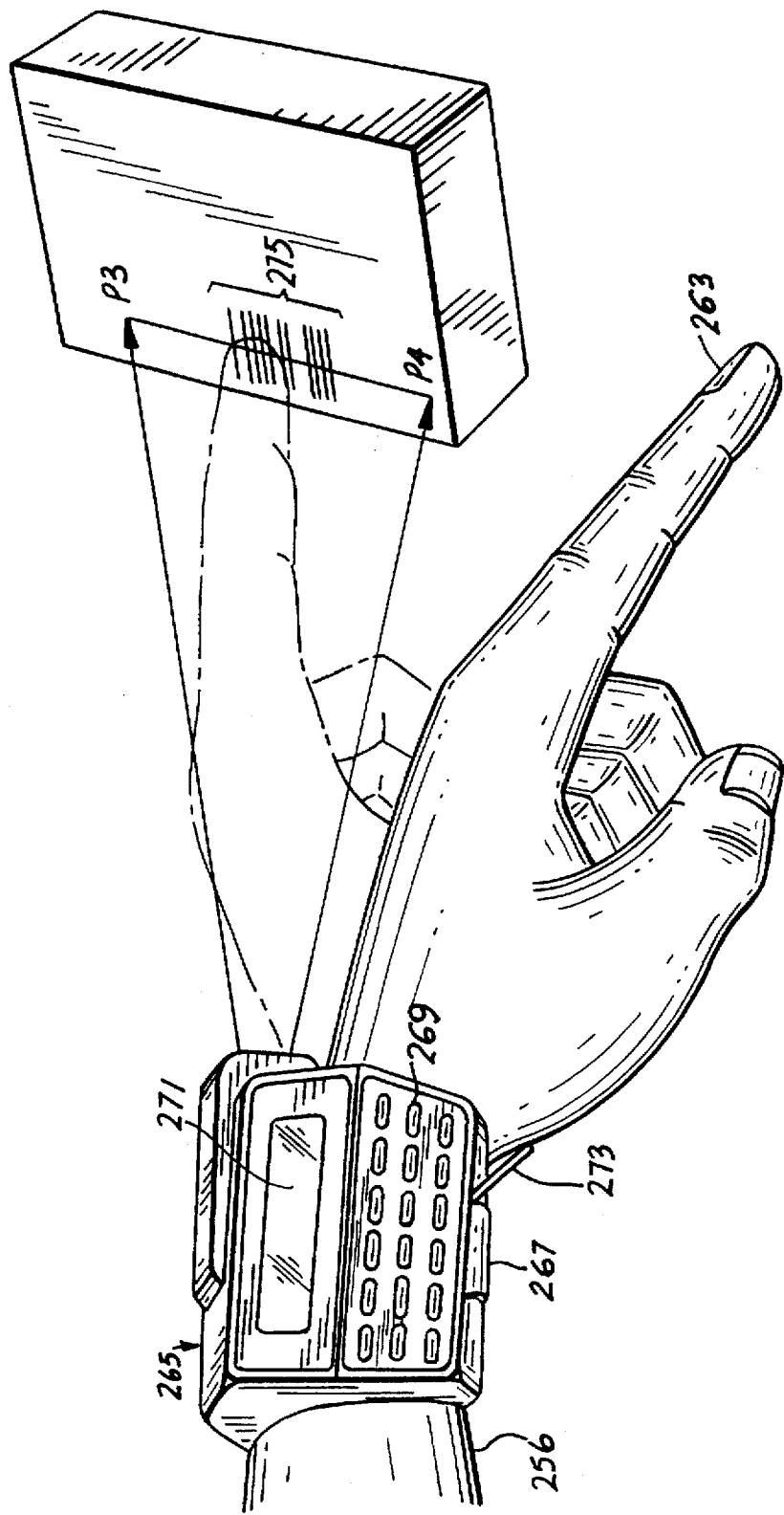
FIG. 7 is a side perspective of an arm-held scanning system.

As shown in FIG. 7, an arm-held housing 265 is mounted adjacent and encircles wrist 256 by means of a strap 267. A keyboard 269 and a display 271 are positioned on the housing 265. In this case, the exit window is positioned adjacent the wrist and elevated above the back of the operator's hand to allow an outgoing light beam and/or reflected light to pass thereover. A trigger switch 273 is pivotably mounted on the housing adjacent the wrist and in the path of inward movement of the hand during wrist flexure. Again, the operator points outstretched finger 263 toward the symbol 275, and swings the forefinger, together with the whole hand, freely in space between points P3 and P4 so as to trace the symbol.

In addition to the embodiments, in which a lever switch may be employed to initiate scanning, a switch may also be provided on the strap which mounts the scanner/terminal on the wrist to perform the scanning initiating function. Such switch when mounted on the inside of the strap so that the switch may be activated by appropriate user motion.

As an alternative to a lever or other pressure operated switch, electronic activation may be utilized to initiate scanning. Object sensing (i.e., triggering when an object is proximate to the scanner), or voice activation (i.e., triggering when the user says "scan") may also be used.

The "glove" approach allows functional modules in addition to scanning to be added or deleted with relative ease. Such modules may include functions such as keyboard, display, communications, power supply, memory, and data storage, printer, or alternative reader technologies (e.g., magnetic stripe) which can be interchangeably attached or detached from electrical connectors disposed the glove. The glove also allows appropriate fixed positioning of such modules so that they may be most conveniently accessed and utilized by the user. As an example, the display may be positioned on the inside of the arm or wrist, and a keyboard positioned so that it is more easily accessed. Such arm-held arrangements serve as complete, independent data terminals.

In another embodiment, a box-shaped housing is incorporated in a glove that is worn on the operator's hand. The glove is preferably composed of an elastomeric material. The housing has a base support that is embedded in the glove and rests above the back of the operator's hand between the knuckles and the wrist. The outgoing light beam and/or returning reflected light pass over the operator's fingers. Reading is initiated either automatically by object recognition, or manually by movement of the operator's hand. For example, clenching the hand can cause a pressure sensor embedded in the glove to generate a trigger signal for initiating reading.

It will be understood that each of the elements described above, or two or more together, also may find a useful application in other types of constructions differing from the types described above.

While the invention has been illustrated and described as embodied in a mountable bar code reader with object sensing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. An optical scanning system for reading indicia having parts of differing light reflectivity, comprising:
   an optical scanner including a light emitter for emitting light directed at said indicia, and a light detector for detecting light reflected from said indicia and for generating therefrom a first signal;
   means for receiving an audio command from a user and for generating therefrom a second signal; and
   control circuitry for controlling the optical scanner in dependence upon said second signal.

2. An optical scanning system for reading indicia having parts of differing light reflectivity, comprising:
   an optical scanner including a light emitter for emitting, light directed at said indicia, and a light detector for detecting light reflected from said indicia and for generating therefrom a first signal indicative of the intensity of the detected light;
   an audio input circuit for receiving an audio command from a user and for generating therefrom a second signal; and
   a control circuit for controlling the optical scanner in dependence upon said second signal.

3. The system according to claim 2, wherein the audio input circuit includes a transducer for converting the audio command uttered by the user into an electrical audio signal.

4. The system according to claim 3, wherein the control circuit processes the electrical audio signal, and generates a control signal for initiating operation of the optical scanner.

5. The system according to claim 2, wherein the light emitter is a laser diode.

6. The system according to claim 2, wherein the light detector is a photosensor.

7. The system according to claim 2, wherein the scanner includes a drive for moving the emitted light across said indicia.

8. The system according to claim 7, wherein the detector has a field of view on said indicia, and wherein the scanner includes a drive for moving at least one of said emitted light and said field of view.

9. The system according to claim 2, and further comprising a keyboard for manually entering, data and a display for displaying information, and wherein the keyboard, the display and the scanner together constitute a data terminal.

10. The system according to claim 2, and further comprising a body mount for mounting the scanner on the user's body.

11. The system according to claim 10, wherein the body mount constitutes a wrist strap.

12. A method of controlling a system for electro-optically reading indicia having parts of differing light reflectivity, comprising the steps of:
    scanning the indicia by emitting light at the indicia, by detecting light reflected from the indicia, and by generating a first signal indicative of the intensity of the detected light;
    receiving an audio command from a user and generating a second signal; and
    controlling the scanning in dependence upon the second signal.

13. The method according to claim 12, wherein the receiving step is performed by converting the audio command uttered by the user into an electrical analog signal.

14. The method according to claim 13, wherein the controlling step is performed by processing the electrical analog signal, and by generating a control signal for initiating the scanning step.

15. The method according to claim 12, wherein the emitting step is performed by a laser diode.

16. The method according to claim 12, wherein the detecting step is performed by a photodetector.

17. The method according to claim 12, wherein the scanning step is performed by moving the emitted light across the indicia.

18. The method according to claim 12, wherein the scanning step is perfomed by moving at least one of the emitted light and a field of view across the indicia.

19. The method according to claim 12, and further comprising the steps of manually entering data and displaying information.

20. The method according to claim 12, and further comrpising the step of wearing the system on the user's body.

* * * * *